United States Patent [19]

Misczyk

[11] Patent Number: 4,526,816
[45] Date of Patent: Jul. 2, 1985

[54] FATTY ACID EMULSION AND COATING OF GLASSWARE THEREWITH

[75] Inventor: Gerald P. Misczyk, DuBois, Pa.

[73] Assignee: Brockway, Inc., (NY), Brockway, Pa.

[21] Appl. No.: 584,342

[22] Filed: Feb. 28, 1984

Related U.S. Application Data

[63] Continuation-in-part of Ser. No. 337,709, Jan. 7, 1982, abandoned.

[51] Int. Cl.$^3$ .......................... B05D 1/36; B05D 7/00
[52] U.S. Cl. ................................. 427/417; 427/402; 427/421; 106/243
[58] Field of Search ............... 427/402, 417, 164, 168, 427/421, 419.5; 65/2, 60.2

[56] References Cited

U.S. PATENT DOCUMENTS

| | | | |
|---|---|---|---|
| 2,676,152 | 4/1954 | Fortess et al. | 252/132 |
| 2,793,132 | 5/1957 | Davis et al. | 106/243 |
| 2,995,533 | 8/1961 | Parmer | 524/586 |
| 3,278,321 | 10/1966 | Hazdra | 106/243 |
| 3,323,889 | 6/1967 | Carl et al. | 427/304 |
| 3,920,869 | 11/1975 | Eckett | 428/35 |
| 3,937,676 | 2/1976 | Schonebarger | 427/407 |
| 3,989,004 | 11/1976 | Scholes | 118/48 |
| 4,039,310 | 8/1977 | Sipe | 65/25 R |
| 4,105,964 | 8/1978 | Lebedev | 323/43.5 |

OTHER PUBLICATIONS

"Wetting & Spreading Properties of Aqueous Solutions", Couples, H., Industrial & Engineering Chem., vol. 27, Oct. 1935, pp. 1219-1221.

Primary Examiner—Theodore Morris
Attorney, Agent, or Firm—Burns, Doane, Swecker & Mathis

[57] ABSTRACT

Provided is a method for coating glass articles with a pourable, stable aqueous based emulsion comprising an unsaturated fatty acid, e.g., oleic or linoleic acid, and an alkali metal salt thereof, wherein the weight ratio of acid to salt in the emulsion ranges from about 2:1 to about 1:1. Application of the emulsion as a coating can be readily effected at glassware temperatures below 200° F. The resultant coating is clear and transparent and provides superior lubricious and abrasion resistant properties.

6 Claims, No Drawings

FATTY ACID EMULSION AND COATING OF GLASSWARE THEREWITH

CROSS REFERENCE TO RELATED APPLICATION

The subject application is a continuation-in-part of U.S. application Ser. No. 337,709, filed Jan. 7, 1982, now abandoned.

BACKGROUND OF THE INVENTION

1. Field of the Invention

The present invention relates to unsaturated fatty acids, e.g., oleic and linoleic acid, emulsions and their use in providing glassware with a superior lubricious, abrasion resistant coating. More particularly, the present invention relates to a method for coating glass articles with a stable, emulsified composition comprising oleic and/or linoleic acid and an alkali metal salt thereof.

2. Description of the Prior Art

Protective coatings for glassware are now and have been utilized for some time. Generally, it is desired that the coating render the surface of the glassware abrasion resistant and hydrophilic so that labels utilizing water soluble adhesives may be easily affixed thereon. Moreover, the coating should afford lubricity to the glassware surface and maintain its properties even when wet, e.g., when contacted with water, steam, etc. It is also important that the protective coating be non-toxic so the glass container can hold consummable products, and be clear and transparent for asthetic appeal.

Many of the coatings which have been used impart several of the aforelisted desirable properties to the surface of the glassware. For instance, polyethylene glycol and stearate soap have been utilized. These coatings provide satisfactory immediate abrasion protection and lubrication to the glassware, but they are soluble in water and therefore are easily rinsed off during the processing or use of the glassware.

Also utilized are coatings of the silcone type which are excellent lubricants and are water repellant. The silicones, however, render the surface of the glassware hydrophobic and therefore special adhesives must be utilized to label the glassware.

Paraffin-type waxes in aqueous dispersions, particularly the polyethylene waxes, have also been utilized as protective coatings for glassware. The use of polyethylene coatings, however, render the surface of the glassware rather hydrophobic and therefore a large percentage of water based adhesives cannot be used to label the glassware. Furthermore, many of the emulsifying agents for polyethylene coatings are toxic and therefore have to be completely removed before the coated glassware article can be used in conjunction with food products.

U.S. Pat. No. 3,278,321 discloses a coating composition for glassware which comprises an acetylated glyceride selected from among mono- and di-glycerides, wherein the acetylated glyceride is obtained via the acetylation of an animal or vegetable oil, and a water soluble polyphosphate alkali metal salt.

The use of a fatty acid, and in particular oleic acid, is known for coating glass containers. See, for example, U.S. Pat. Nos. 3,920,869 and 4,039,310. Indeed, the use of an oleic acid coating is presently one of the most desired and widely used coatings for glassware in the industry. In using oleic acid, a conventional "hot end" treatment of the glass container is usually first conducted, wherein the glass surface is treated with a metal compound in order to form a metal oxide coating thereon, e.g., a tin comprising coating. Following this treatment, special apparatus is used to apply oleic acid to the glass container in a conventional "cold end" treatment. See, for example, U.S. Pat. Nos. 3,989,004 and 4,105,964. Oleic acid vapor, normally at a temperature between 250°-270° F., is condensed on the glass surface as containers pass through a coating hood. During vapor condensation, sodium present in the glass reacts chemically with a fraction of the oleic acid to form its salt, sodium oleate. Thus the coating deposited on the glass container is comprised of both oleic acid and its salt.

The fraction of salt formed will depend on the relative differences in temperature between glass and vapor. When the glass containers are approximately at the same or slightly below the temperature of the vapor, a greater amount of salt forms than if the glass container was at a temperature much less than that of the vapor. The temperature of the glassware during the application of the oleic acid, however, must be extremely high, i.e., in excess of 200° F. and at times approaching 300° F., in order for a suitable coating of the oleic acid to be achieved. The application of oleic acid at such high temperatures is a hardship, particularly from an energy consumption viewpoint. Thus, the ability of applying a suitable coating at lower temperatures, i.e., at temperatures less than 200° F., would be desirable and advantageous provided such a coating would possess suitable properties of abrasion resistance, clarity and lubricity, when both wet and dry.

Emulsions, in general, of fatty acids such as oleic acid are also known. For example, U.S. Pat. No. 2,396,718 discloses a composition which comprises oleic acid and oleic acid soap, which is prepared by neutralizing from 60 to 68 percent of free oleic acid with a caustic solution, e.g., KOH, of satisfactory strength. The composition thereby comprises a minor amount of free oleic acid. U.S. Pat. No. 3,404,991 discloses a fatty acid emulsion comprising a fatty acid having from 8 to 22 carbon atoms and a soap of a rosin Diels-Alder adduct. British Pat. No. 643,765 discloses emulsions of saturated fatty acids containing from 12 to 24 carbon atoms which contain a fatty acid ester of a polyethylene glycol. See also U.S. Pat. Nos. 2,676,152; 2,793,132; 3,937,676 and 3,953,351, as well as Cupples, *Industrial and Engineering Chemistry*, Vol. 27, Oct. 1935, pp. 1219–1221. An energy efficient method for applying a fatty acid emulsion, however, which provides a coating for glassware possessing the desired properties and which has been used successfully in the coating of glassware has heretofore not been known to the prior art.

Accordingly, it is an object of the present invention to provide a novel process for applying a fatty acid coating for glass articles which provides superior abrasion resistance and lubricity properties when dry or wet.

It is another object of the present invention to provide an emulsion of an unsaturated fatty acid, and in particular oleic or linoleic acid, which is pourable and easily handled and which can be suitably employed as a water based spray coating for glass articles. A convenient method for preparing and applying said emulsion as a coating is also an object of the present invention.

It is another object of the present invention to provide a coating for glassware which is non-toxic, and which may also be easily applied to the glass article as an aqueous dispersion.

It is still another object of the present invention to provide a coating, and specifically a fatty acid coating which can be readily applied to a glass article, which article has been subjected to a hot end treatment, at a temperature below 200° F., while still providing a clear, uniform coating having excellent abrasion resistance and lubricity properties.

It is still a further object of the present invention to provide a process for applying such coatings to a glass article.

These and other objects, as well as the scope, nature and utilization of the invention, will be apparent to those skilled in the art from the following description and the appended claims.

SUMMARY OF THE INVENTION

It has now been surprisingly found that the foregoing objectives can be realized by utilizing an aqueous based emulsion comprising an unsaturated fatty acid comprising from 14 to 22 carbon atoms, e.g., oleic acid and/or linoleic acid, and an alkali metal salt thereof, wherein the weight ratio of acid to salt in the emulsion ranges from about 2:1 to about 1:1. Oleic and linoleic acid are the preferred unsaturated fatty acids. The emulsion can be prepared by adding the fatty acid to an aqueous solution containing an alkali metal hydroxide, which is present in an amount sufficient to react with from about 33 percent to about 50 percent by weight of the acid to thereby form the alkali metal salt of the acid. The mixture is then stirred, preferably slowly, until the reaction is complete and emulsification occurs. In a preferred embodiment, oleic acid and sodium oleate comprise the emulsion. Mixtures of fatty acids, e.g., oleic acid and linoleic acid, if desired, can be used.

The emulsion can be applied to a glass article to thereby provide the glass article with a coating comprising the acid and the alkali metal salt thereof. Application of the emulsion preferably comprises spraying a diluted aqueous dispersion comprising from 0.0001 to about 0.0007 ounce, and more preferably from 0.0002 to about 0.0006 ounce, of solids for every gallon of water, with the application being conducted at a glass temperature below 200° F., e.g., preferably from about 160° to about 180° F.

DETAILED DESCRIPTION OF THE PREFERRED EMBODIMENTS

The emulsions of the present invention which can be applied to glass articles to provide a coating therefor are stable, pourable, aqueous based emulsions comprising at least one unsaturated fatty acid containing from 14 to about 22 carbon atoms and an alkali metal salt thereof, with oleic acid being the preferred acid and sodium salts, e.g., sodium oleate, being the preferred salts employed. The oleic acid/sodium oleate emulsion is preferred since same has been found to provide clear coatings on glass containers which have been subjected to a hot end metal oxide treatment, and which coatings provide superior abrasion resistance and lubricity characteristics, both when wet and dry. Mixtures of fatty acids such as oleic and linoleic acid can be employed in accordance with the present invention.

It is important that the fatty acid used in accordance with the present invention be an unsaturated fatty acid for it has been found that the unsaturated fatty acid emulsions can generally provide coatings of the desired superior abrasion resistance and lubricity characterisitics when both wet and dry in comparison to saturated fatty acid emulsions.

Moreover, the acid to salt ratio in the emulsion must be within the range of from about 2:1 to about 1:1 in order to provide a coating having the desired coating qualities. If the amount of salt, e.g., sodium oleate, is in excess of the amount of acid, e.g., oleic acid, the wet properties deteriorate considerably as the amount of salt increases. On the other hand, if an insufficient amount of salt is present in the composition, i.e., the weight ratio becomes much greater than 2:1, the coating clarity becomes aesthetically displeasing and exhibits characteristics of a hazy, oily film. Accordingly, a weight ratio of from about 2:1 to about 1.1 should be observed.

It is most preferred that the weight rato of acid to salt be about 2:1, for emulsified compositions containing such amounts of acid and salt provide stable emulsions and coatings of extreme clarity and optimum lubricity and abrasion resistance.

Besides the unsaturated fatty acid, e.g., oleic and/or linoleic acid, and the respective alkakli metal salt, the emulsion can also contain minor amounts of other fatty acids and hence their respective alkali metal salts. Indeed, it is preferred to employ food grade oleic acid, due to its approval by the FDA, which generally contains minor amounts of other fatty acids. For example, Emersol 6313, a food grade oleic acid, contains 75 percent oleic acid, 6 percent linoleic acid, 6 percent palmitoleic acid, 5 percent palmitic acid, 3 percent myristoleic acid, 3 percent myristic acid, 1 percent linolenic acid and 1 percent margaric acid. Other suitable, food grade, oleic acids include those designated by the marks Emersol 6321 and Emersol 6333 LL.

The aqueous based emulsion is preferably prepared by adding the unsaturated fatty acid or mixture thereof, to an aqueous solution containing an alkali metal base, preferably an alkali metal hydroxide, and most preferably sodium hydroxide. The alkali metal hydroxide is present in solution in an amount sufficient to react with from about 33% to about 50% by weight of the available acid to thereby convert from 33% to about 50% by weight of the available acid to its alkali metal salt. The resultant salt then emulsifies the remaining excess of acid in the water. The mixture is preferably stirred until the reaction is complete and emulsification occurs.

It is most preferred that the mixing be sufficiently deliberate so that no aeration occurs. Fast mixing, e.g., by the use of high speed homogenizers, can result in an aeration of the emulsion and hence an increase in volume. As a result, the resultant emulsion can be less pourable and thereby more difficult to handle.

It is also preferred that the emulsion be prepared via the reaction of appropriate amounts of acid and base so that the resulting emulsion contains from 1 to about 30 percent by weight emulsified solids, more preferably from about 1 to about 9 percent by weight solids, and most preferably about 2.5 to about 7.5 weight percent solids. The advantage of being able to prepare such unsaturated fatty acid/salt emulsions having such solid levels are their tendency to flow, which aids handling of the emulsion. The resultant is pourable and stable.

The acid/salt emulsion of the present invention may also be prepared by simply dispersing the acid and salt in water in the desired amounts. The in situ preparation of the emulsion, however, is preferred due to the convenience advantages it offers.

The concentrated emulsion formed can be applied to glassware as is, but for practical considerations in the use of spray equipment, it is preferred to dilute the emulsion. Dilution can be made to any suitable concentration of solids. Generally, however, dilution is made so that a solids-aqueous dispersion containing from about 0.0001 to about 0.0007 ounce, and most preferably from 0.0002 to about 0.0006 ounce, of solids per gallon of water is obtained.

The dispersion or emulsion is then applied to the surface of the glass article to be coated in accordance with the present invention through the use of conventional spray equipment. Application of the emulsion is effected while the glassware is at a temperature sufficient to allow for drying of the emulsion prior to contact with other glassware, e.g., bottle/bottle contact. It is important, however, that the temperature of the glassware not be so high that the glassware is temperature shocked when the emulsion is applied. Generally, it is preferred that the temperature be about 200° F. or below, e.g., in the temperature range of from about 140° to about 200° F., and most preferably in the range of from about 160° to about 180° F. In this manner, the energy advantages of the present invention are also utilized. The coated glass article is then allowed to dry subsequent to the spray application, with the drying being allowed to occur from the contained heat within the bottle, to thereby achieve a glass article having a coating which comprises oleic or linoleic acid and an alkali metal salt thereof in accordance with the present invention.

The glass articles to which the present invention generally applies are those which have been subjected to a hot end metal oxide treatment to form a metal oxide coating, e.g., an oxide coating of tin, thereon. The use of such hot end treatment conventionally precedes the coating of a glass article with a fatty acid such as oleic acid. Many "hot end" treatments are known and all are suitable. Examples of such treatments are those described in U.S. Pat. No. 3,920,869 and the patents cited therein.

The present invention provides one with a unique method for applying an unsaturated fatty acid material suitable for use as a protective glassware coating which can be conveniently prepared, can be easily handled, and can be readily and conveniently applied to glass articles at temperatures of about 200° F. and less, preferably in the range of from 160° to about 180° F., via the spray application thereof. This is in contrast to the conventional processes of having to vaporize the fatty acid such as oleic acid and apply same to glassware at temperatures that are much higher, e.g., greater than 200° F. and approaching 300° F. Yet, the coating provided by the present invention is clear, non-toxic and sufficiently hydrophilic to thereby enable conventional water soluble adhesives to be utilized in the attachment of labels to the glass article. Moreover, the coating provides the article with superior lubricious and abrasion resistance characteristics when dry or contacted with water.

The following examples are given as specific illustrations of the claimed invention. It should be understood, however, that the specific details set forth in the examples are merely illustrative and in nowise limitative. All parts and percentages in the examples and the remainder of the specification are by weight unless otherwise specified.

EXAMPLE 1

This example illustrates the in situ preparation of an oleic acid-sodium oleate emulsion useful in accordance with the present invention.

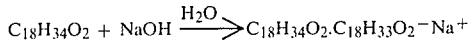

$$C_{18}H_{34}O_2 + NaOH \xrightarrow{H_2O} C_{18}H_{34}O_2 \cdot C_{18}H_{33}O_2^- Na^+$$

100 ml of $H_2O$ and 1.4 g (0.035 mol) of 76% NaOH were introduced into a 250 ml beaker equipped with a magnetic stirrer. Stirring was commenced and upon dissolution of the caustic, 21.6 g (0.0765 mol) of Emersol 6313 oleic acid (75) were added thereto. Stirring was continued until a clear gel containing some white precipitate was formed. This material was stored and within 24 hours the precipitate dissolved and the final product was formed. In this instance, 34.82% of the oleic acid reacted to form sodium oleate. The emulsion concentrate contained 18.1 percent by weight solids as follows:

| | | |
|---|---|---|
| 10.56 g. | Oleic acid | 8.6% |
| 5.64 g. | Sodium oleate | 4.6% |
| 6.02 g. | Remaining fatty acids and salts | 4.9% |
| | | 18.1% solids |

EXAMPLE 2

This example illustrates the in situ preparation of an oleic acid-potassium oleate emulsion.

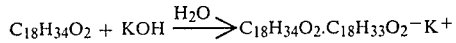

$$C_{18}H_{34}O_2 + KOH \xrightarrow{H_2O} C_{18}H_{34}O_2 \cdot C_{18}H_{33}O_2^- K^+$$

400 ml of $H_2O$ and 8.25 g (0.1447 mol) of KOH (85%) were added to a 1000 ml beaker equipped with a magnetic stirrer. Stirring was commenced and upon dissolution of the caustic, 89.4 g (0.3165 mol) of Emersol 6313 oleic acid (75%) was added thereto. Stirring was continued until a clear gel containing some white precipitate was formed. This material was stored and within 24 hours the precipitate dissolved and the final product was formed. In this instance, 39% of the oleic acid reacted to form potassium oleate. The final emulsion concentrate contained 20.43 percent solids as follows:

| | | |
|---|---|---|
| 40.98 g. | Oleic acid | 8.23% |
| 31.32 g. | Potassium oleate | 6.29% |
| 29.40 g. | Remaining fatty acids and salts | 5.91% |
| | | 20.43% solids |

EXAMPLE 3

This preparation is similar to that described in Example 2 except that a larger scale was used and a homogenizer was used for mixing.

13.0 g (0.2281 mol) of KOH (85%) were dissolved in 640 ml $H_2O$ contained inside a 1000 ml beaker. Mixing was commenced by using a Silverson Model L2R homogenizer. To the caustic solution was added 143 g (0.5063 mol) of Emersol 6313 oleic acid (75%), which at once formed, a fluffy highly aerated emulsion. The emulsion increased in volume by 40% due to aeration and as a result was not pourable, (e.g., no flow possible), thereby complicating handling.

In the following examples the lubricity and abrasion resistance, which are important coating properties, were measured using a slip angle unit and static load tester.

The slip angle unit employed consisted of a flat table on which three coated containers were stacked pyramid style. The table was then tilted through an angle that resulted in the top bottle slipping in relation to the bottom two bottles, which were held stationary. This angle gives a quantitative measure of the lubricity of the coating, where the lower the angle, the better the coating. Typically, uncoated glass yields results in the 45° range, while coated glass will be in the 10°–25° range, depending on the type and amount of coating present.

The static load tester employed measured the amount of load necessary to cause abrasion of one bottle area against another. When the coating fails, visible glass to glass damage occurs. The static load tester consisted of two bottle holding chucks capable of adjustment to various bottle sizes and shapes. The bottom chuck was driven at a slow speed of four inches per thirty seconds, while the top chuck remained stationary. Bottles were mounted so that movement of the bottom chuck exposed a new glass to glass contact area continuously, while a test load was applied to one of the bottles. This type of apparatus is described, for example, in U.S. Pat. No. 3,323,889.

EXAMPLE 4

An oleic acid-sodium oleate emulsion was prepared in accordance with the procedure of Example 1 to yield an emulsion containing 20% solids as follows:

|  |  | % |
|---|---|---|
| oleic acid | 12.16 g. | 9.7 |
| sodium oleate | 6.64 g. | 5.3 |
| remaining fatty acids and their salts | 6.29 g. | 5.0 |
|  |  | 20.0% solids |

The emulsion was then diluted to 1 oz/gal and used to coat a glass bottle which had first been subjected to a hot end coating of tin oxide, with the lubricity and abrasion resistance of the coating being measured when both dry and wet with the slip angle unit and static load tester described previously. The results are as follows:

| Lubricity | | Abrasion Resistance | |
|---|---|---|---|
| Dry | Wet | Dry | Wet |
| 8° | 8° | 150 lbs. | 150 lbs |

Appearance: clear film

EXAMPLE 5

Four oleic acid-sodium oleate emulsions were prepared in accordance with the general in situ procedure of Example 1, except that the weight percent of oleic acid converted to oleate in each differed, as defined below. Each emulsion was then diluted to form a solids—aqueous disperson containing about 1 oz of solids per gallon of solution. The solutions were then sprayed onto tin coated 12 oz bottles, which bottles were at a temperature of about 180° F. The tin levels on the bottles were on the average 50 CTU. The lubricity and abrasion resistance characteristics of each resultant coating were then measured, with the result being as follows:

| % oleic acid converted to oleate | Lubricity | | Abrasion Resistance | |
|---|---|---|---|---|
|  | Wet | Dry | Wet | Dry |
| 20 | 15° | 21° | 120 lbs. | 50 lbs |
| 35 | 8° | 8° | 160 lbs | 180 lbs |
| 60 | 8° | 8° | 130 lbs | 140 lbs |
| 80 | 15° | 8° | 65 lbs | 100 lbs |

EXAMPLE 6

An oleic acid-sodium oleate emulsion was prepared as follows:

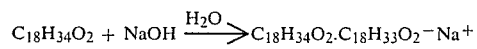

$$C_{18}H_{34}O_2 + NaOH \xrightarrow{H_2O} C_{18}H_{34}O_2 \cdot C_{18}H_{33}O_2^- Na^+$$

100 ml of $H_2O$ and 0.77 g (0.019 mol) of 76% NaOH were introduced into a 250 ml beaker equipped with a magnetic stirrer. Stirring was commenced and upon dissolution of the caustic, 11.9 g (0.042 mol) of Emersol 6313 oleic acid (75%) were added thereto. Stirring was continued until a clear gel containing some white precipitate was formed. This material was allowed to stand for one hour and then an additional 100 ml of $H_2O$ was added. In this instance, 34.82% of the oleic acid was reacted to form sodium oleate. The emulsion concentrate contained 4.58 percent by weight solids as follows:

| 5.83 g | Oleic Acid | 2.37 |
|---|---|---|
| 3.11 g | Sodium oleate | 1.27 |
| 3.32 g | Remaining fatty acids and salts | 0.92 |
|  |  | 4.58% solids |

The emulsion was then diluted to one oz/gal with water and used to spray coat a glass bottle which had first been subjected to a hot end coating of tin oxide. Tin oxide coating levels were measured as follows ussing an AGR hot end coating meter: minimum—15 CTU, maximum—40 and average 30 CTU. The lubricity and abrasion resistance of the coating being measured when both dry and wet as described previously. The results were as follows:

| Lubricity | | Abrasion Resistance | |
|---|---|---|---|
| Dry | Wet | Dry | Wet |
| 15–20° | 13–18° | 20–75 lbs. | 30–90 lbs. |

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A method for coating a glass article comprising formulating a pourable stable emulsion consisting essentially of an unsaturated fatty acid containing 14 to 22 carbon atoms and an alkali metal salt thereof, by adding the fatty acid to an aqueous solution containing an alkali metal hydroxide in an amount sufficient to react with from about 33% to about 50% by weight of the said acid and to thereby form the alkali metal salt of said acid, then stirring the mixture until the reaction is complete and emulsification occurs, and then spraying the emulsion in diluted form onto the glass article wherein the glass temperature of the article is in the range of from about 140° to about 200° F.

2. A method for coating a glass article comprising spraying thereon an aqueous emulsion consisting essentially of at least one unsaturated fatty acid containing 14 to 22 carbon atoms and an alkali metal salt thereof, wherein the weight ratio of acid to salt in the emulsion ranges from about 2:1 to about 1:1 wherein the glass temperature of the article is in the range of from about 140° to about 200° F.

3. The method of 1 wherein the fatty acid comprises oleic acid or linoleic acid.

4. The method of claim 3 wherein the glass temperature of the article is in the range of from about 160° to about 180° F.

5. The method of claim 3 wherein the acid is oleic acid and the salt is sodium oleate.

6. The method of claim 3 wherein the glass article coated comprises a layer of metal oxide on the glass surface.

* * * * *